Figure 1:
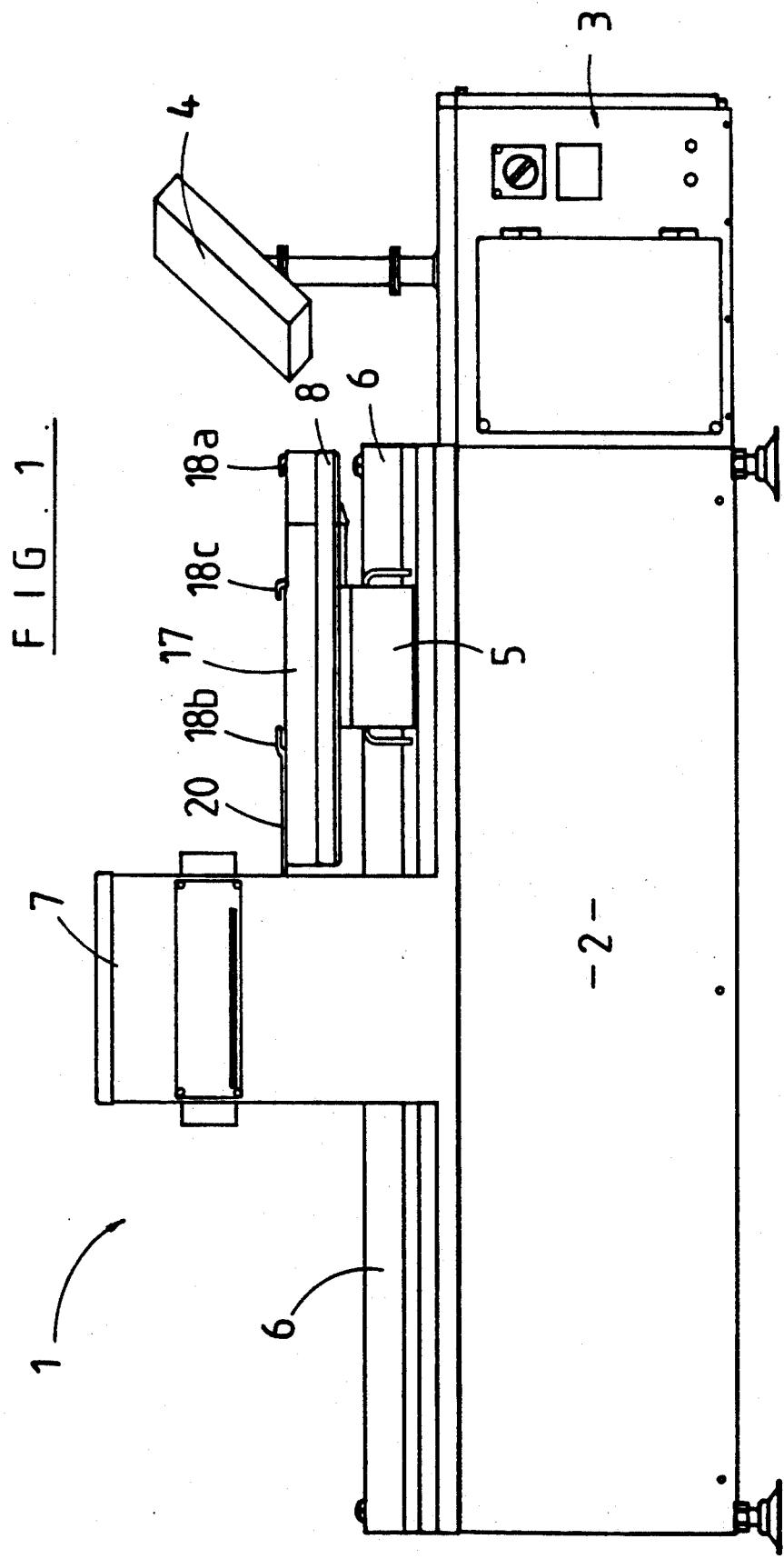

United States Patent [19]
Sandos et al.

[11] Patent Number: 5,192,242
[45] Date of Patent: Mar. 9, 1993

[54] METHOD AND APPARATUS FOR REMOVING MEAT

[75] Inventors: David A. Sandos, Eneabba, Australia; William F. van Berkum; Gordon Wickham, both of Hamilton, New Zealand

[73] Assignee: The Meat Industry Research Institute of New Zealand Inc., Hamilton, New Zealand

[21] Appl. No.: 771,788

[22] Filed: Oct. 4, 1991

Related U.S. Application Data

[63] Continuation of Ser. No. 509,674, Apr. 12, 1990, abandoned.

[30] Foreign Application Priority Data

Apr. 14, 1989 [NL] Netherlands .......................... 228761
Jun. 8, 1989 [NL] Netherlands .......................... 229449

[51] Int. Cl.5 .............................................. A22C 17/04
[52] U.S. Cl. .................................... 452/136; 452/135; 452/138
[58] Field of Search ............... 452/136, 135, 160, 149, 452/121, 138, 150, 151, 153, 161, 162

[56] References Cited

U.S. PATENT DOCUMENTS 3,982,299  9/1976  Kompar ........................... 17/1 R

FOREIGN PATENT DOCUMENTS

| 141659 | 6/1951 | Australia | 17/61 |
| 214902 | 1/1986 | Australia . | |
| 557569 | 11/1957 | Belgium | 17/61 |
| 541006 | 5/1957 | Canada | 17/61 |
| 8703468 | 11/1988 | European Pat. Off. | 17/54 |
| 3116639 | 11/1986 | Japan | 17/61 |

Primary Examiner—Willis Little
Attorney, Agent, or Firm—Marvin H. Kleinberg

[57] ABSTRACT

There is disclosed an apparatus and a method for the mechanical removal of whole-tissue meat from the region of the vertebrae of an animal carcass including a support for support at least a part of the carcass. A cutting mechanism makes a longitudinal cut in the meat along the line of the vertical dorsal protrusions of the vertebrae. There is also provided a substantially rigid clearing mechanism having a substantially fixed shape and causing relative movement between the support and the clearing mechanisms such that the clearing mechanism is able to move longitudinally along at least part of the carcass to force the meat away from the vertical and lateral protrusions of the vertebrae and, if present, at least part of the length of the ribs extending from the vertebrae.

16 Claims, 8 Drawing Sheets

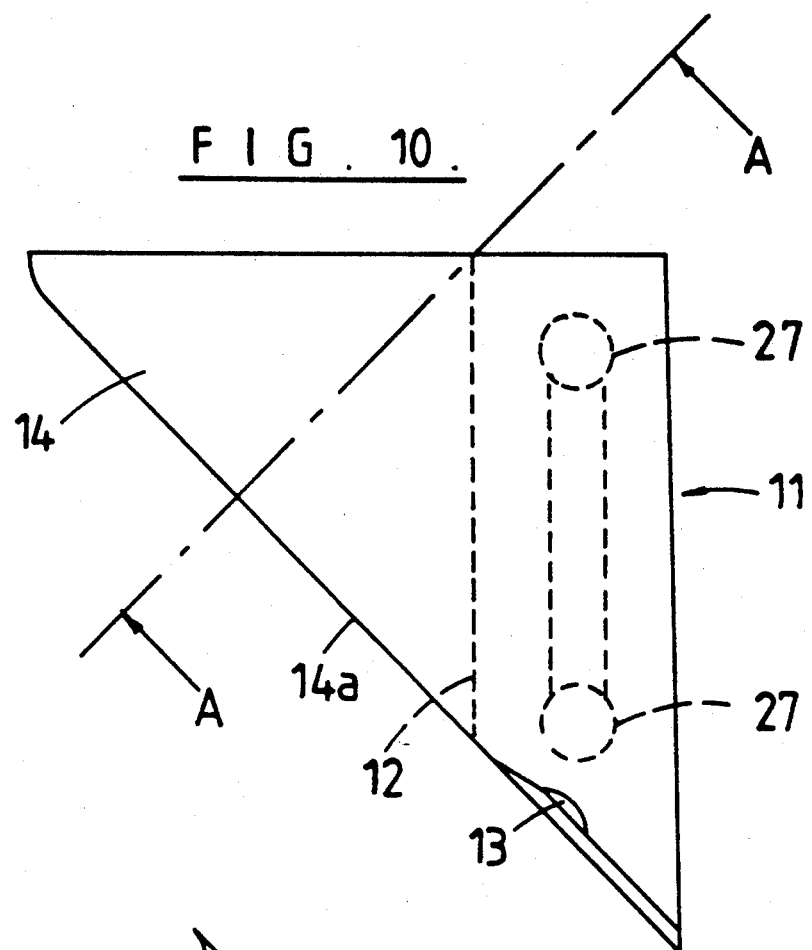
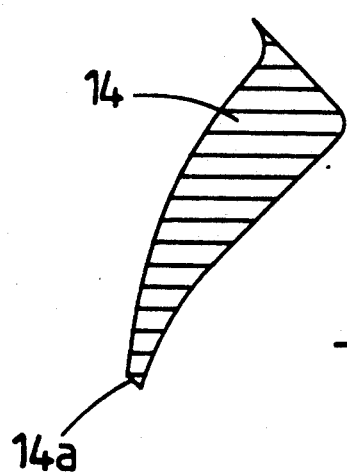

METHOD AND APPARATUS FOR REMOVING MEAT

This is a continuation of copending application Ser. No. 07/509,674 filed on Apr. 12, 1990, now abandoned.

This invention relates to a method and apparatus for the removal of meat in a substantially intact form (i.e. whole-tissue meat) from a part of the carcass of a slaughtered animal.

The manual boning of meat from carcasses of slaughtered animals is a labor-intensive operation and as such the processing costs involved in producing boneless whole-tissue meat are high. Existing technology for the separation of meat and bones mechanically is primarily directed at the recovery of meat from bones where the bulk of the meat has already been removed manually. The resultant product from such processes is in the form of a slurry or finely comminuted pieces of meat, usually with relatively high concentrations of calcium. Such a product has limited shelf life and the ranges of use as to which such product can be put are limited.

Accordingly in our New Zealand patent specifications 2044515 and 214902, we have disclosed methods and apparatus for the removal of meat in substantially intact form from the whole carcasses of slaughtered animals. These methods and apparatus have employed meat removing elements which are designed to adapt, as they move along the carcass, to closely follow at least part of the contours of the carcass in order for the meat to be removed at, or as near as possible, the junction of bone and meat. These meat removing elements can, for example, be flexible disks or as disclosed in patent specification 214902, a driven rough-surfaced filament.

Such meat removal elements have been successful in achieving whole-tissue meat removal from a carcass, however, difficulty has been experienced in achieving clean and high meat yield removal in the area of the vertical and lateral protrusions of the vertebrae. In view of the meat in the saddle region of the carcass being able to command high prices, it is important that as much of this high value meat as possible be removed from the bone while at the same time preserving the quality of the meat by avoiding damage (i.e. tearing) of the muscle and unwanted knife cuts.

Part of the difficulty in achieving high quality meat removal and high yield in the saddle region with the arrangements disclosed in our previous patent specification, result from the inability for the meat removing elements to closely follow the contours of the vertical and lateral protrusions of the vertebrae. For example with the flexible disks, it is difficult to provide disks of sufficient flexibility to closely follow the contours while at the same time have sufficient stiffness to scrape the meat from the bone. It has been considered that the ability of the meat removing element to flex and thereby follow the contours of the bone was necessary in order to achieve clearing of the meat as close as possible to the bone. Surprisingly, however, it has been now discovered that by using a clearing or meat removal element of substantially fixed shape and rigidity, it is possible to obtain better results than with clearing or removing elements having flexibility.

Accordingly, in one broad aspect of the invention, there is provided a method of removing whole-tissue meat from the region of the vertebrae of an animal carcass, said method comprising the steps of fixedly locating said carcass or part thereof on a support, making a longitudinal cut in the meat along the line of the vertical dorsal protrusions of the vertebrae and causing substantially rigid clearing means of substantially fixed shape to move longitudinally along said carcass or part thereof to force the meat away from the vertical and lateral protrusions of the vertebrae and if present at least part of the length of the ribs extending from the vertebrae.

According to a preferred form of the invention, the clearing means follow immediately after the forming of the longitudinal cut.

In a preferred form of the invention relative movement is caused to take place between the cutting and clearing means on the one hand and the support on the other hand. In the most preferred form of the invention, this is achieved by moving the support relative to the stationary cutting and clearing means.

According to a second broad aspect of the invention, there is provided mechanical apparatus for the removal of whole-tissue meat from the region of the vertebrae of an animal carcass, said apparatus comprising support means for supporting the or part of the carcass, cutting means to make a longitudinal cut in the meat along the line of the vertical dorsal protrusions of the vertebrae, and substantially rigid clearing means of substantially fixed shape, means for causing relative movement between the support and said clearing means such that said clearing means is able to move longitudinally along the or part of the carcass to force the meat away from the vertical and lateral protrusions of the vertebrae and if present at least part of the length of the ribs extending from the vertebrae.

In a preferred form of the invention, the cutting means and the clearing means are formed as a single unit such that the clearing operation takes place immediately following the cutting operation. Preferably the support means is movable relative to the fixed cutting and clearing unit.

Preferably the support includes a flexible surface which can be formed, for example, by flexible pad inserts.

Figure 2:
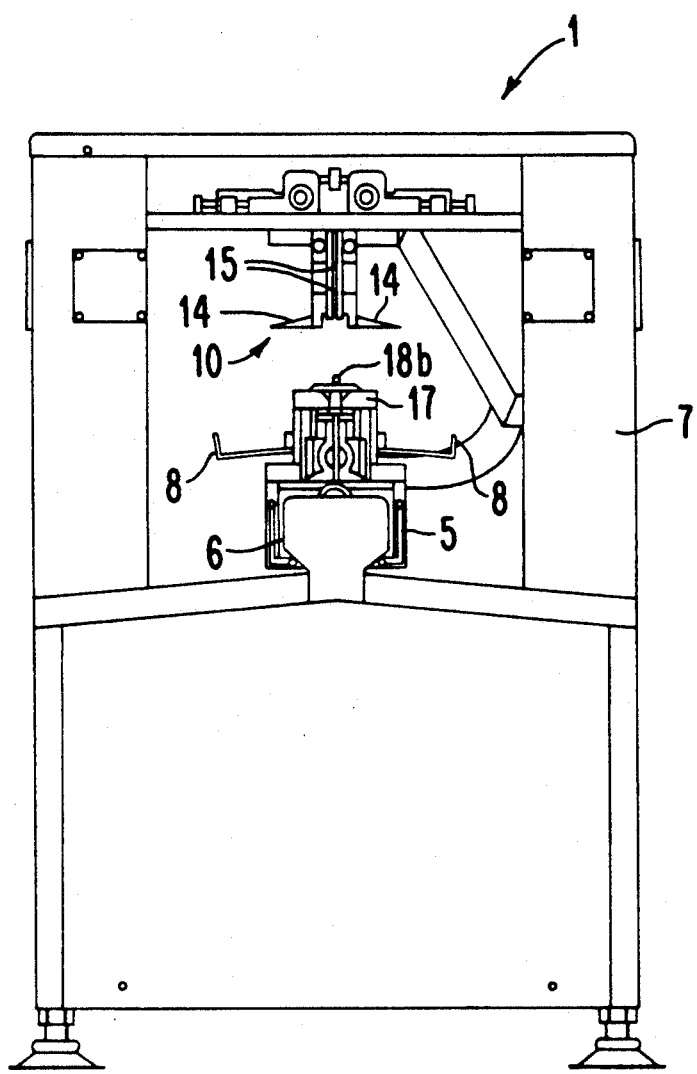
Figure 3:
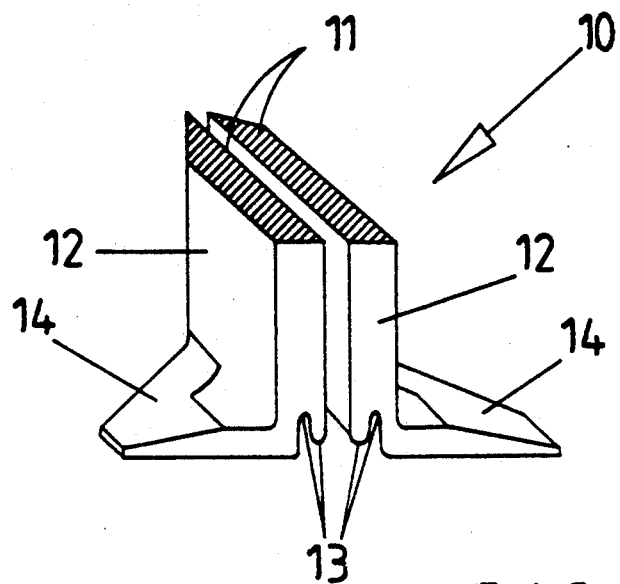
Figure 4:
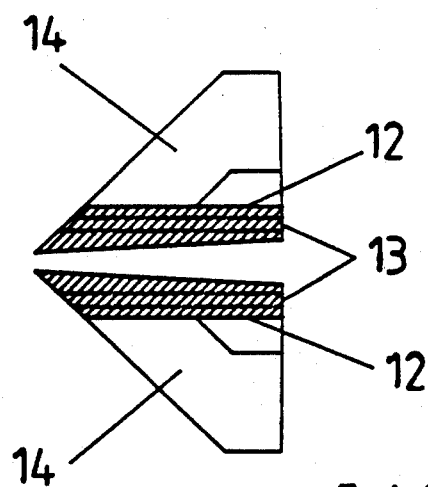
Figure 5:
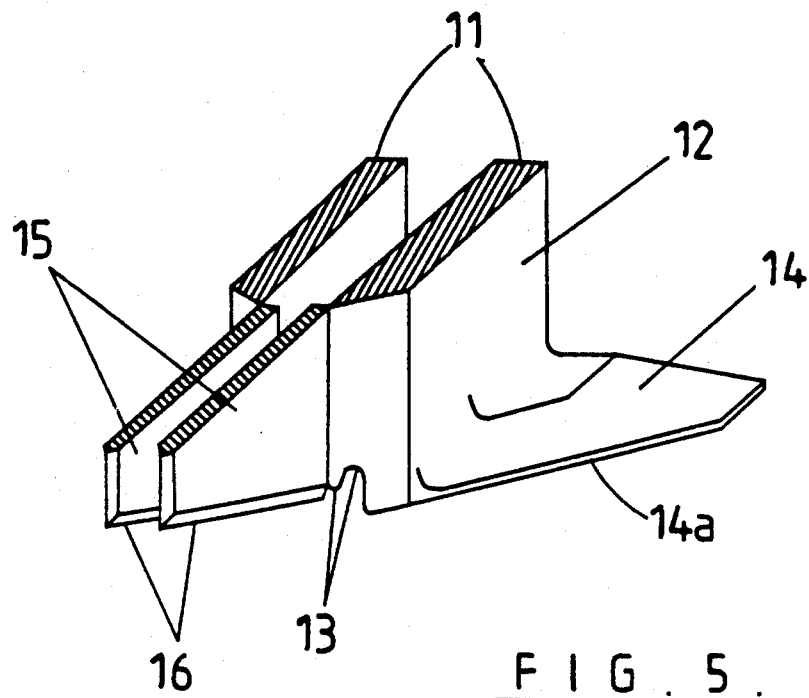
Figure 6:
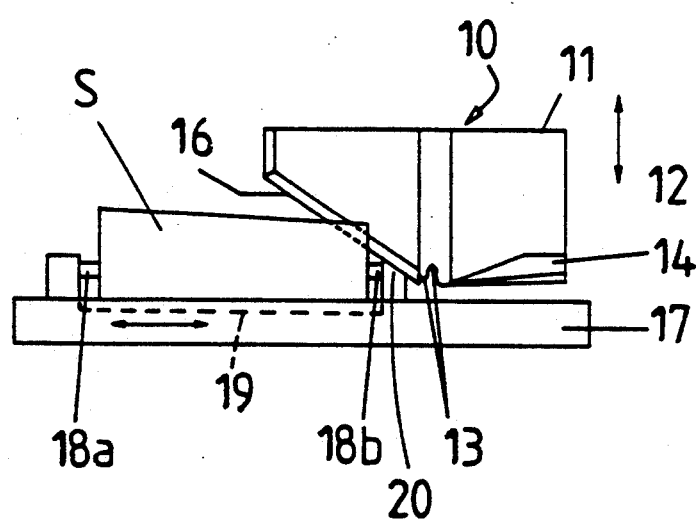
Figure 7:
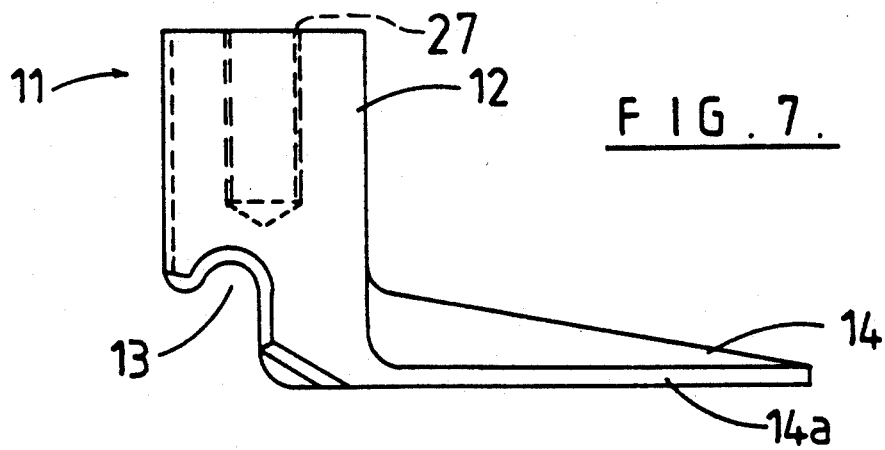
Figure 8:
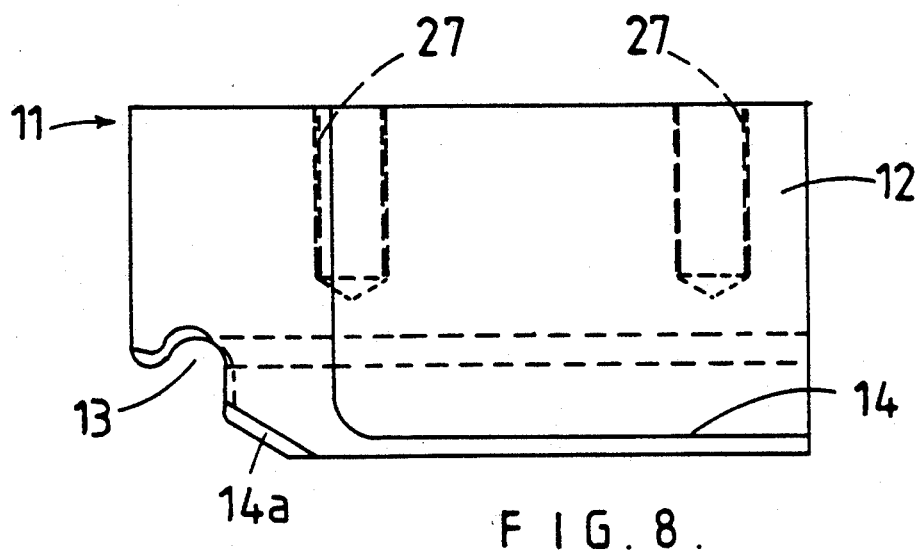
Figure 9:
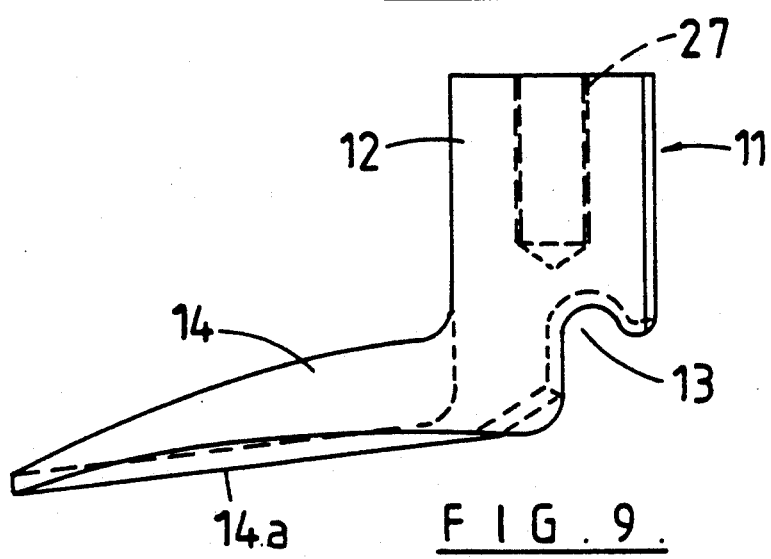
Figure 12:
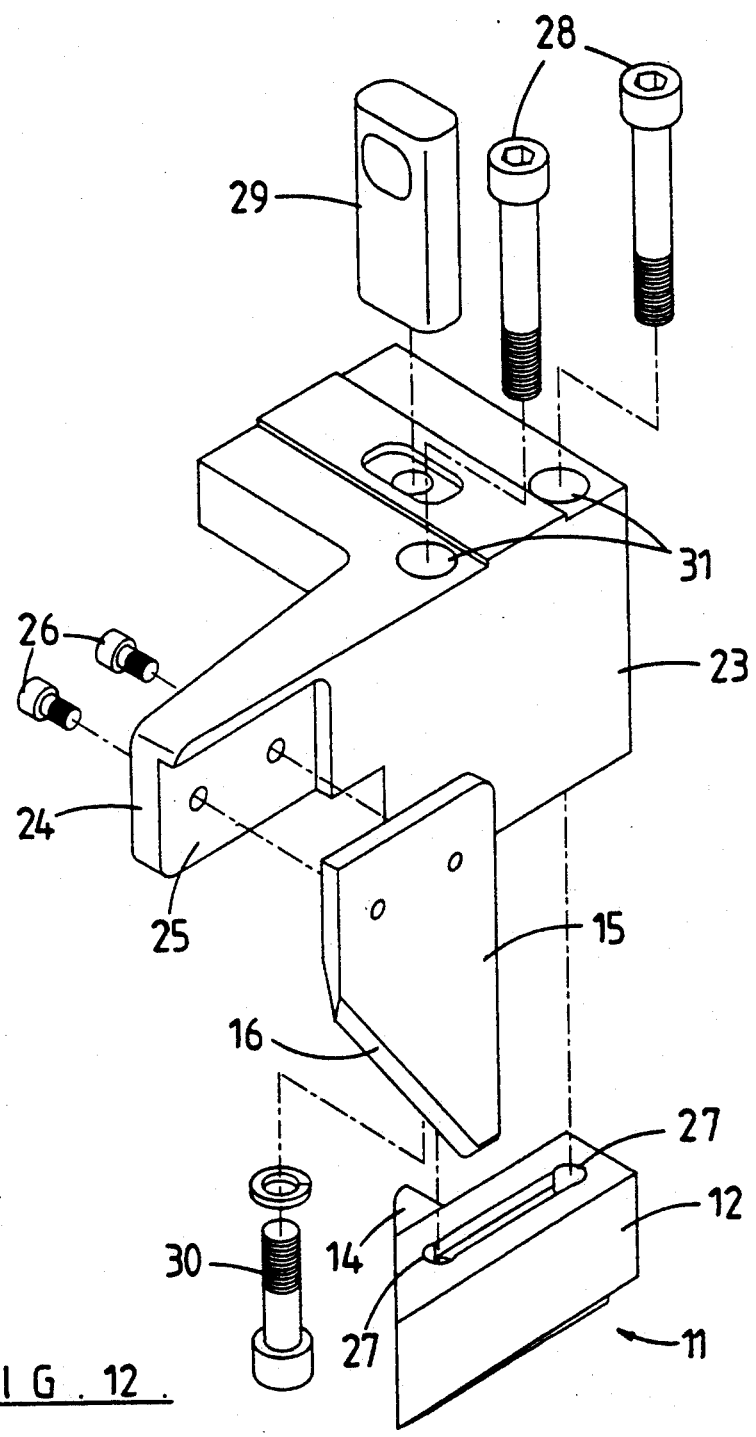
Figure 13:
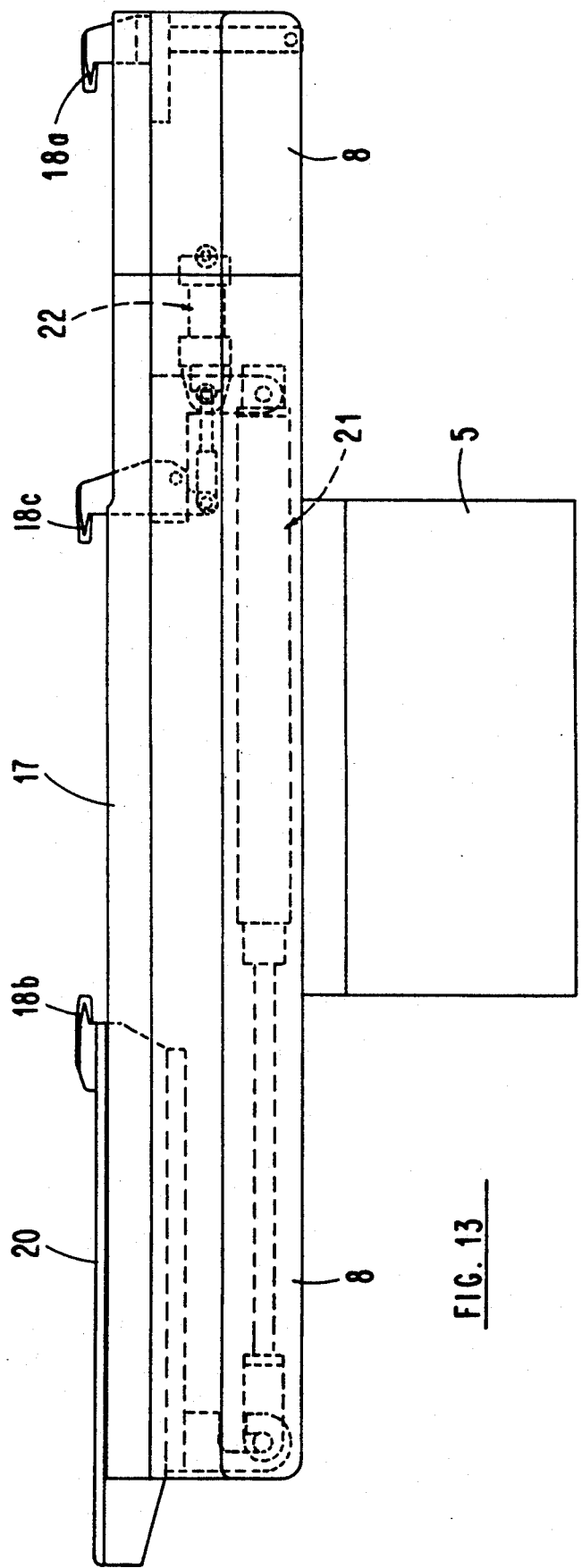

To more fully describe the invention according to one preferred form, reference will be made to the accompanying drawings in which:

FIG. 1 general elevation view of apparatus according to the invention,

FIG. 2 is an end view of the apparatus as shown in FIG. 1,

FIG. 3 is a schematic perspective view of the clearing means viewed from the rear, FIG. 4 is a plan view of the clearing means as illustrated in FIG. 3, FIG. 5 is a schematic perspective view from the front of the cutting means formed as a unit although the actual attachment method is not shown, FIG. 6 is a largely schematic illustration of the cutting and clearing unit in conjunction with the or part of the saddle of a carcass located on a movable support, FIG. 7 is a front elevation view of a preferred form of the clearing means, FIG. 8 is a side view of the clearing means shown in FIG. 7, FIG. 9 is a rear elevation view of the clearing means of FIGS. 7 and 8 but showing the wing portion bent according to a preferred form, FIG. 10 is a plan view from below of the clearing means of FIG. 9, FIG. 11 is a section on line A—A of FIG. 10, FIG. 12 is an exploded view of the clearing means of FIGS. 7 to 11, a mounting unit and a cutting means in accordance with a preferred form of the invention, FIG. 13 is a side view of the support and a carriage according to a preferred form thereof.

Shown in FIGS. 1 and 2 is a general layout of one form of a machine 1 incorporating the present invention. The machine includes a base 2 having a control system cabinet 3 and a machine operator's console 4. A carriage 5 is mounted for sliding movement along a track (not shown) within a cover 6 supported by base 2. The cover 6 has longitudinally extending slots through which arms from carriage 5 locate whereby the carriage is supported for sliding movement along the track. A housing 7 projecting upwardly houses operating mechanism for raising and lowering the clearing means 10. A support or movable table 17 is carried by carriage 5. Projecting from table 17 are ledges 8 onto which cleared meat can drop.

The method and apparatus according to this invention can be used to process a full carcass, half a carcass (i.e. a full carcass split vertically), a full saddle, a full or part rack or loin or any other part of the carcass having the vertebrae present therein. For ease of reference the following description relates to apparatus for processing a full or part saddle with meat being cleared simultaneously from both sides of the vertical dorsal projections.

The clearing means 10 comprise a pair of plows 11 which are designed to locate over the vertebrae of the carcass. For the purposes of ease of description, the following will refer generally to the saddle S portion of a carcass or part of the saddle (i.e. the rack or loin) from which meat is being cleared.

As shown schematically in FIGS. 3 to 5 each plough 11 has a vertical portion 12 and a lateral wing 14 joined to the vertical portion 12. An intermediate shaped portion 13 is provided at the join of wing 14 with vertical portion 12. Wing 14 is of swept-back configuration having a generally rearwardly inclining leading edge 14a. In the situation where the plough 11 is to remove meat from that portion of the saddle S having ribs projecting from the vertebrae i.e. the rack, the outer portion of the wing 14 can be extended and curved over so as to substantially follow the contour of the rib as it curves downwardly away from the vertebrae.

In the preferred form of the invention, a pair of cutting members 15 are mounted with or adjacent vertical portions 12, said cutting members 15 each having a cutting edge 16 which extends forwardly of but inclines upwardly away from wings 14. Cutting edges 16 are spaced apart so that in operation they form a cut in the meat immediately adjacent each side of the vertical dorsal protrusions of the vertebrae.

Saddle S is located on a support which, according to a preferred form of the invention, is a movable table 17. In a preferred form flexible pad inserts 19 are located in recesses in table 17. Extending longitudinally on table 17 but not shown in the drawings, is a rib having a substantially V or U shaped groove extending therealong such that the downward protrusion of the vertebrae can fit therein to thereby laterally locate the saddle.

A flexible pad insert 19 is located in a recess on either side of the V or U shaped groove. The flexibility of the recessed flexible pad inserts allows the more rigid lateral protrusions of the vetebrae and, if present, at least part of the length of the ribs extending from the vertebrae to sink into the pads while at the same time forcing upward the less rigid intercostal muscle tissue thus resulting in increased meat removal.

In order to longitudinally locate the saddle, pins 18 engage in the spinal column of the vertebrae. One or both of these pins.. 18 are mechanically movable. Generally, however, as shown there are three pins 18 so that the table can locate both a complete saddle or part thereof (e.g. the loin). Thus pin 18a is fixed in position and pin 18b is movable longitudinally on the table 17 under the action of a linear actuator 21 (see FIG. 13). The third pin 18c is essentially in a fixed position but a linear actuator 22 can be operated to raise or lower the pin depending on whether a full or part saddle is being cleared.

The operation of pins 18b and 18c can be controlled manually by the machine operator or they can be of automatic operation upon a saddle or part thereof being sensed, by suitable sensing means (not shown), as being positioned on table 17.

The table is coupled with suitable moving means such as, for example, a double acting linear actuator (not shown). Accordingly, in use table 17 can be moved to the limit of one of its direction of movement and the saddle S can be located thereon either manually by a machine operator or automatically by suitable mechanical loading means. With saddle S suitably positioned as aforementioned, table 17 can then commence movement, toward the other limit of its movement, whereupon the leading end of Saddle S is sensed by a proximity sensor. Alternatively a sequenced operation of table and the cutting/clearing unit can be carried out which will obviate the need to sense the leading end of the saddle. The cutting/clearing unit 10 is thus lowered down toward the table to take up a position substantially as shown in FIG. 4. The raising and lowering movement of the cutting/clearing unit 10 is preferably effected by one or more pneumatic linear actuators with the actual movement of the cutter/clearing unit being controlled by suitable support and control arms.

Preferably the cutter/clearing unit 10 is lowered down onto a plate 20 (which forms part of the movable mount of pin 18b) which ensures that the wings 14 are positioned at the correct height to move into saddle S such as to move over and not become fouled with the ribs of the saddle. Relative movement between the cutter/clearing unit 10 is achieved by the continued movement of table 17.

As a consequence cutters 16 form cuts along each side of the vertical dorsal protrusions of the vertebrae and the closely following ploughs 11 cause the meat as a whole to be cleared from the vertical and horizontal protrusions of the vertebrae as well as the parts of the ribs extending from the vertebrae. The intermediate shaped portions 13 of ploughs 11 provide clearance for protrusions of the vertebrae to pass horizontally along the ploughs thereby avoiding any plough contact which could result in breakage of the protrusions. Preferably the underside of the wings 14 are not flat but a vertical clearance angle is provided (i.e. the front of the wing is lower than the trailing edge) as this has been found to assist a clean removal of the meat from the bone.

The downward pressure on the cutter/clearing unit 10 from the pneumatic linear actuators is suitably controlled so that there is sufficient application of pressure to ensure a correct clearing action but still allow the wings 14 to be self adjusting in height to follow the contours of the backbone.

Upon a second proximity sensor (not shown) detecting the trailing end of saddle S cutter/clearing unit 10 is raised away from the now fully cleared saddle. The boned muscle in ledges 8 and the remaining bones on table 17 can then be removed from the table or else the table moved back to its starting position and the boned muscles and bones removed.

FIGS. 7 to 11 illustrate in more detail a preferred form of a plough 11 while FIG. 12 shows a mounting arrangement of plough 11 and cutter 15 with a mounting block 23. The mounting block 23 includes a flange 24 with recess 25 in which a portion of the cutter 15 is mounted by cap screws 26. The vertical portion 12 of plough 11 has tapped bores 27 in which cap screws 28 passing through bores 31 in block 23 engage. A lug 29, fastened in place by cap screw 30, projects from block 23 to provide a means of coupling block 23 to the raising and lowering mechanism within housing 7.

In a preferred form of the invention wing 14 is bent (as shown in FIGS. 10 and 11) so that it outwardly droops. This configuration is found to give improved clearing characteristics.

While the foregoing description has referred to the plough being of fixed shape and rigid it will be appreciated that the cross-sectional shape and dimensions of the wing results in a certain amount of movement to occur. While this movement does not result in the wings being flexible the wings are generally substantially rigid i.e. semi-rigid and maintain a substantially fixed shape.

It has been found that by using a substantially fixed shape and rigid plough (preferably in conjunction with a flexible pad support) substantially all of the meat is removed from the bone. Accordingly it is possible to obtain substantially complete removal of the eye muscle (longissimus dorsi) and/or other attached muscle as required for some end products or alternatively partial removal of this muscle for other end products, e.g. complete removal from thoracic vertebrae and partial or non-removal from the rib bones or complete removal from both.

It is envisaged that the method and apparatus according to the present invention can also include cutting means for the cutting of the rib bones free from the vertebrae after meat separation therefrom.

The present invention provides increased meat yield, absence of knife cuts on removed product and increased boning room productivity when compared to manual boning techniques.

What is claimed is:

1. Mechanical apparatus for the removal of whole-tissue meat from the region of the vertebrae of an animal carcass, said apparatus comprising:
   support means which provide support to the bones of the carcass from which meat is to be removed, said support means including locating means for locating the carcass or part of the carcass;
   cutting means having a substantial vertical cutting edge which is able, in use, to form a longitudinal cut through the meat to be immediately adjacent to the vertebrae, such cut being along the line of the vertical dorsal protrusions of the vertebrae;
   substantially rigid clearing means including a wing which projects laterally relative to the cutting edge and has a leading edge which is generally rearwardly inclined relative to the direction of said longitudinal movement along said carcass, said wing being positioned rearwardly of said cutting edge and substantially below said cutting edge such that in use it can be located immediately adjacent the lateral protrusions of the vertebrae;
   moving means for causing relative movement between said support means and said clearing means such that said clearing means are able to move longitudinally relative to the carcass; and
   pressure applying means for causing a pressure directed toward said support means to be applied to said clearing means such that contact occurs between the bones supported by said support and said clearing means so that said clearing means follows the contours of the bones to thereby force the meat away from the dorsal and lateral protrusions of the vertebrae and, if present, at least part of the length of the ribs extending from the vertebrae.

2. Apparatus as claimed in claim 1 wherein the cutting means and the clearing means are formed as a single unit such that the clearing operation takes place immediately following the cutting operation.

3. Apparatus as claimed in claim 1 wherein the support means includes a table, said locating means being located on the table and comprising pins for longitudinally locating the carcass or part of the carcass and a longitudinally disposed rib for transverse location of the carcass or part of the carcass.

4. Apparatus as claimed in claim 3 further including means for raising and lowering the cutting and clearing unit relative to the support means.

5. Apparatus as claimed in claim 1 wherein the clearing means comprises at least one plow element, said plow having a vertical portion from which said laterally disposed wing projects.

6. Apparatus as claimed in claim 5 wherein at least part of the underside of the wing is curved outwardly and downwardly relative to said vertical portion.

7. Apparatus as claimed in claim 5 wherein a clearance is provided in the vicinity of the transition between the vertical portion and the lateral wing to provide a clearance for protrusions of the vertebrae as the plows laterally along the or part of the carcass.

8. Apparatus as claimed in claim 1 wherein flexible pads are located with said support, said pads being, in use, engageable with the lateral protrusions of the vertebrae and, if present, at least part of the length of the ribs extending from the vertebrae.

9. Apparatus as in claim 1 wherein said pressure applying means include one or more linear actuators coupled with said clearing means.

10. Apparatus as in claim 9 wherein said linear actuators are pneumatically driven.

11. Mechanical apparatus for the removal of whole-tissue meat from the region of the vertebrae of an animal carcass, said apparatus comprising:
    support means which provide support to the bones of the carcass from which meat is to be removed;
    cutting means having a substantially vertical cutting edge which is able, in use, to form a longitudinal cut through the meat to be immediately adjacent to the vertebrae, such cut being along the line of the vertical dorsal protrusions of the vertebrae, said cutting edge being aligned with the direction of relative movement and inclining rearwardly and downwardly;
    substantially rigid clearing means of substantially fixed shape, which include a vertical portion from which a wing projects laterally, there being a clearance provided in the vicinity of the transition between the vertical portion and the lateral wing to provide a clearance for protrusions of the vertebrae as the clearing means is moved laterally along the carcass or part of the carcass, at least part of the underside of said wing being curved outwardly and downwardly relative to said vertical portion, said wing having a generally rearwardly inclined leading edge, said wing being positioned rearwardly of said cutting edge and substantially below at least the major part of said cutting edge;

moving means for causing relative movement between said support means and said clearing means such that said clearing means is able to move longitudinally relative to the carcass; and pressure applying means for causing a pressure directed toward said support means to be applied to said clearing means such that contact occurs between the bones to thereby force the meat away from the vertical and lateral protrusions of the vertebrae and, if present, at least part of the length of the ribs extending from the vertebrae.

12. Apparatus as claimed in claim 11 further including means for raising and lowering the cutting and clearing unit relative to the support means.

13. Apparatus as claimed in claim 11 wherein the support means includes a table having at least two locating means for locating the or part of the carcass on the table, said locating means comprising pins for longitudinally locating the or part of the carcass and a longitudinally disposed rib for transverse location of the or part of the carcass.

14. Apparatus as claimed in claim 11 wherein flexible pads are located with said support, said pads in use, engaging lateral protrusions of the vertebrae and, if present, at least part of the length of the ribs extending from the vertebrae.

15. Apparatus as claimed in claim 11 wherein two cutting means and clearing means are provided said cutting means and clearing means being spaced apart such that the cutting means form a pair of parallel cuts along the line of the vertical dorsal protrusions of the vertebrae and each clearing means clears meat from respective sides of the vertical protrusions of the vertebrae.

16. Apparatus as in claim 11 wherein said cutting means and clearing means are formed as a single unit.

* * * * *